United States Patent [19]

Lonnemo

[11] 3,716,987

[45] Feb. 20, 1973

[54] POWER TRANSMISSION

[75] Inventor: Kurt R. Lonnemo, Troy, Mich.

[73] Assignee: Sperry Rand Corporation, Troy, Mich.

[22] Filed: Sept. 22, 1971

[21] Appl. No.: 182,676

[52] U.S. Cl. ................................................60/19
[51] Int. Cl. ........................................F02b 41/00
[58] Field of Search ..........................................60/19

[56] References Cited

UNITED STATES PATENTS

| 2,774,436 | 12/1956 | Ferris | 60/19 X |
| 3,003,309 | 10/1961 | Bowers et al. | 60/19 X |
| 3,230,699 | 1/1966 | Hann et al. | 60/19 X |

Primary Examiner—Edgar W. Geoghegan
Attorney—Theodore Van Meter

[57] ABSTRACT

A hydrostatic transmission using a variable displacement pump is driven by an internal combustion engine and has a control system wherein a single pedal or lever controls both the engine throttle and pump displacement. The position of the pedal or control lever determines both the throttle opening and the input torque to the hydrostatic transmission. The control automatically varies the pump displacement to maintain the selected input torque against the momentary load conditions on the hydraulic motor in accordance with the torque-speed characteristics of the engine. The control utilizes a hydraulic bridge circuit, having in its feedback leg, a pair of laminar flow restrictions varied in accordance with the position of the pump displacement regulator.

3 Claims, 8 Drawing Figures

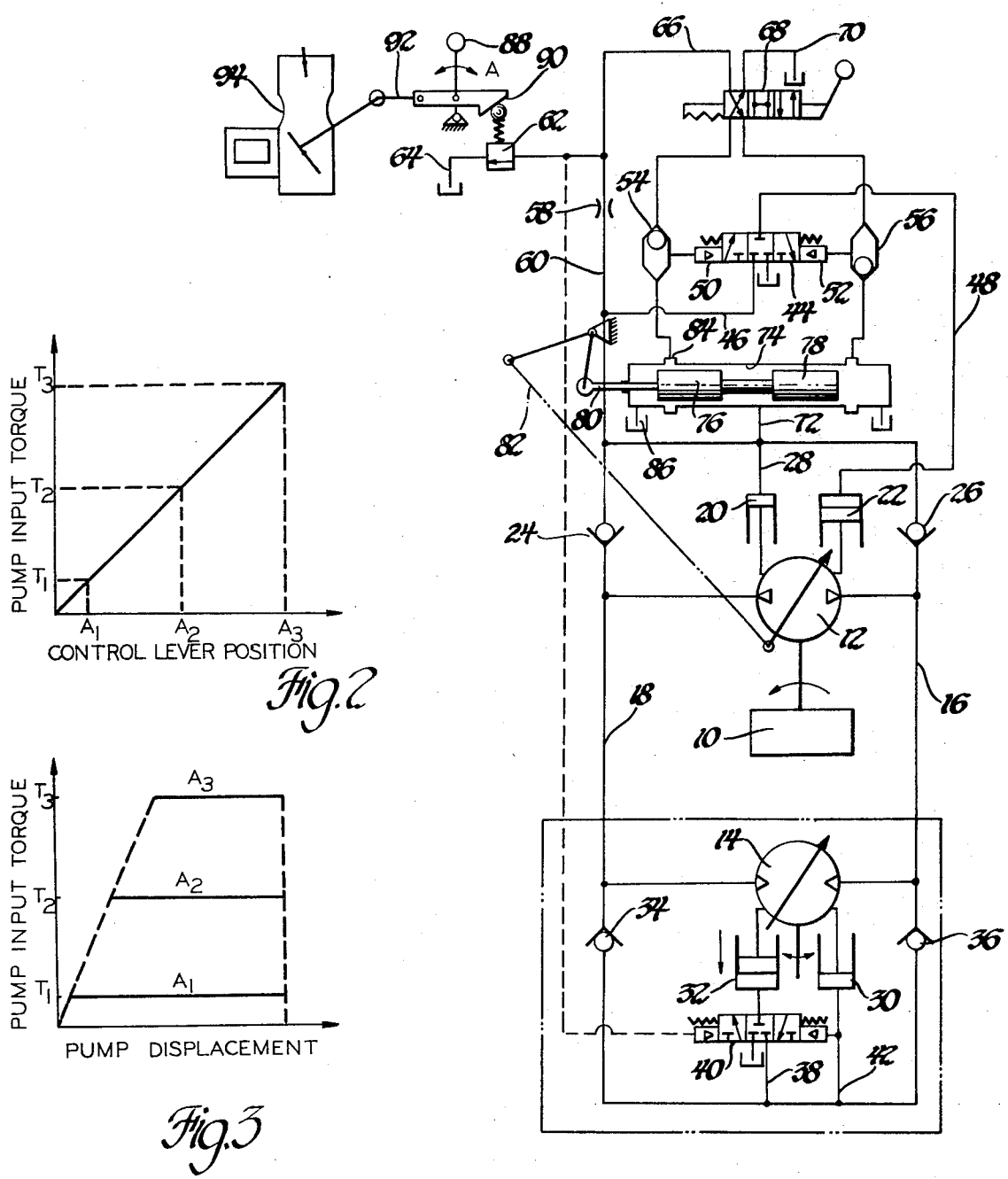

POWER TRANSMISSION

Although high performance, moderately priced hydrostatic units for vehicle propulsion have been available for many years, they have not been widely adopted. The major reason for this has been the lack of adequate controls to efficiently and conveniently match the torque-speed characteristics of the internal combustion engine to meet varying requirements of load and operator demand. The superior ability of the hydrostatic transmission to provide infinitely variable speed ratios with positive, nearly slipless drive under all conditions, has been, in a way, a drawback because of the difficulty an operator finds in simultaneously controlling both the engine throttle and the transmission ratio. As a result, various compromise control systems have been devised to supplement the limited human ability in this regard, but only at the sacrifice of efficiency and performance.

The object of this invention is to provide a control system for an internal combustion prime mover and a hydrostatic transmission which may be operated by a single movable control pedal or lever and which will automatically select the optimum transmission ratio for utilizing the engine's full capabilities at any selected throttle opening in order to most efficiently drive the vehicle against the continually changing load conditions and demands of the operator.

This object is achieved by the provision of a control system for a variable ratio hydrostatic transmission which comprises a variable displacement pump and a hydraulic motor driven thereby and an internal combustion prime mover which drives the pump, and which control system comprises a ratio changing member for the transmission, a hydraulic servomotor for actuating the member, a pilot valve for controlling the servomotor, means forming a bridge circuit for controlling the pilot valve and including two bleed circuits, the first constituting a command circuit having, in series, a fixed restriction and a variable pressure relief valve, the second constituting a feedback circuit and having, in series, a pair of laminar flow restrictions of variable length connected to be varied by the ratio changing member, means connecting the bridge circuit to that side of the hydrostatic transmission which is at the highest operating pressure, means connecting the pilot valves to respond to the difference in pressure between the intermediate points in the two bleed circuits, a fuel supply regulator for the internal combustion prime mover and a common operating member for the fuel supply regulator and for the variable pressure relief valve, whereby the torque input to the pump at any fuel supply rate may be matched to the torque output of the prime mover at a desired point on its torque-speed characteristic curve for that fuel supply rate.

IN THE DRAWINGS

FIG. 1 is a circuit diagram of a control system for an engine and hydrostatic transmission incorporating a preferred form of the present invention.

FIG. 2 is a plot of control lever position against pump input torque.

FIG. 3 is a plot of pump displacement against pump input torque at various control lever positions.

Figure 4:
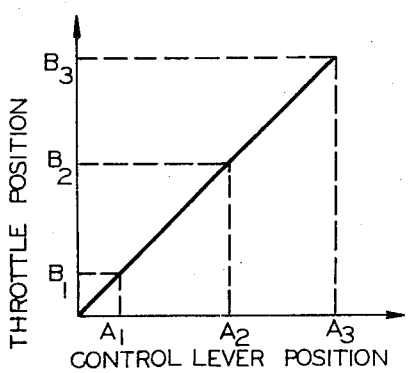
FIG. 4 is a plot of control lever position against throttle position.

Referring to FIG. 1, the circuit diagram there indicates a variable ratio hydrostatic transmission driven by internal combustion prime mover 10, such as a gasoline or diesel engine. The transmission comprises a reversible variable displacement pump 12 and a variable displacement hydraulic motor 14 connected in the usual power transmission circuit indicated by the lines 16 and 18. The usual transmission accessories for circuit charging, for filtering, for cooling, etc. which are conventionally provided in such transmissions, are not illustrated.

The displacement varying member of the pump 12 is actuated by a servomotor consisting of a small area piston and cylinder 20 and a large area piston and cylinder 22. Piston 20 is subjected to the operating pressure in the transmission through check valves 24 and 26 and the control pressure supply line indicated generally at 28. The servomotor 20—22 is capable of shifting the displacement varying member of pump 12 from full displacement in one direction to full displacement in the other.

Motor 14 has its displacement varying member controlled by a similar pair of piston and cylinders 30 and 32 which, however, are capable of shifting only between a position of minimum displacement in one direction and full displacement in the same direction. Transmission line pressure is directed through check valves 34 and 36 to a control pressure line 38 and pressure responsive pilot valve 40, which controls the piston and cylinder 32 and through line 42 to the piston and cylinder 30, all in the well-known manner to regulate the displacement of motor 14 in accordance with pressure conditions in the transmission circuit. Alternatively, the motor 14 may be of the fixed displacement type and dispense with this pressure responsive control system.

The displacement of pump 12 is controlled by a pilot valve 44 which receives control pressure from the main trans-mission lines through branch 46 and either admits fluid or exhausts it from the piston and cylinder 22 through the line 48. Valve 44 is preferably of the spring centered type. Valve 44 has pilot actuators 50 and 52 connected through shuttle valves 54 and 56 to a hydraulic bridge control circuit, the first half comprising a fixed restriction 58 fed from the control pressure line 28 through branch 60 and a variable pressure relief valve 62 leading to exhaust at 64. At the intermediate point between restrictor 58 and valve 62, a sensing line 66 leads to a selector valve 68 for selecting which of the two shuttle valves 54 or 56 will be connected to branch 66 and the other connected to exhaust at 70. This bleed circuit and its connection to the shuttle valves constitute the command half of the hydraulic bridge circuit.

The feedback half of the hydraulic bridge circuit is duplicated, there being one for forward and one for reverse direction of operation. The feedback bleed circuit commences at a branch 72 which feeds system control pressure to a pair of pairs of variable laminar flow restrictions. These are constituted by a hollow cylinder 74 containing a pair of somewhat loose fitting plungers 76 and 78 having a stem 80 which is shiftable by means of a mechanical connection indicated at 82 with the ratio varying member of the transmission; that is to say, with the displacement varying member of pump 12.

In the position of the parts illustrated, plunger 76 is acting as one pair of laminar flow restrictions, the first restriction being from line 72 to the groove 84 and the second restriction being from the groove 84 to the exhaust 86. Plunger 78 is ineffective in the circuit at this position, but is similarly operative when the pump flow is reversed.

The pressure drop through the laminar flow restrictions is proportional to the length of the path, which is determined by the displacement of pump 12 as transmitted through the mechanical connection 82 to stem 80. Since the pressure supplied through line 72 is the operating pressure in the main transmission circuit, it follows that the pressure sensed at the groove 84 represents the product of pressure and pump displacement in the main hydraulic transmission circuit, and thus is a direct reflection of the input torque required to drive the pump 12 by the internal combustion prime mover 10. That is to say, the pressure sensed at groove 84 and fed to the pilot valve actuator 50 is a measure of the torque input requirement of the pump 12. Thus, for any pressure level for which the relief valve 62 may be set at the moment, and which is fed through line 66 and valve 68 to the opposing pilot valve actuator 52, there will be maintained a corresponding pressure level in actuator 50. This means that valve 44 will be actuated, right or left, as required and will maintain the input torque of pump 12 at this set level. As load conditions change, it may require higher or lower ratios in the transmission to maintain motor 14 moving with maximum output, but regardless of load changes at the output of the transmission, the torque at the input will remain constant.

This will be true at any output level demanded by the operator. Valve 62 has its pressure setting controlled by the manual lever or pedal 88 which operates upon the spring of the valve through a cam 90. Control lever 88 is also connected through a link 92 with the fuel supply control of the engine 10 which is represented diagrammatically by the carburetor 94. This indicates diagrammatically any of the usual fuel supply controls, such as injection pumps or other devices which are customarily used for the manual control of internal combustion engines.

Referring now to FIG. 2, the relationship between the position of control lever 88 and the pressure level set at valve 62, (that is to say, the pump input torque) is indicated for three different control lever positions, A1, A2, A3, producing pump input torques, T1, T2, T3. This diagram indicates a straight line relationship, but this could be a nonlinear relationship depending upon the linkage between lever 88 and cam 90 and the shape of cam 90, as will be readily understood. FIG. 3 represents pump displacement plotted against pump input torque for the three control lever positions A1, A2, and A3. This shows a flat limiting relationship upon the input torque at all pump displacements except those where the load is beyond the pressure capability of the transmission.

FIG. 4 illustrates control lever position A1, A2, and A3 plotted against throttle positions at the carburetor 94 indicated at B1, B2, and B3. Here again, a straight line relationship is indicated, but is not necessary depending upon the specific linkage connecting control lever 88 with the fuel supply regulator 94.

Figure 5:
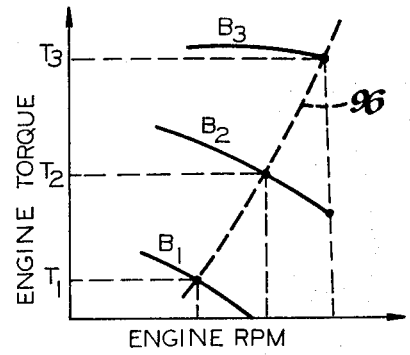
FIG. 5 is a plot of engine r.p.m. versus engine torque at various throttle positions.

FIG. 5 illustrates three specific torque speed curves of a typical internal combustion engine, and by the dotted line 96 shows the point along those curves where optimum engine performance is achieved.

Figure 6:
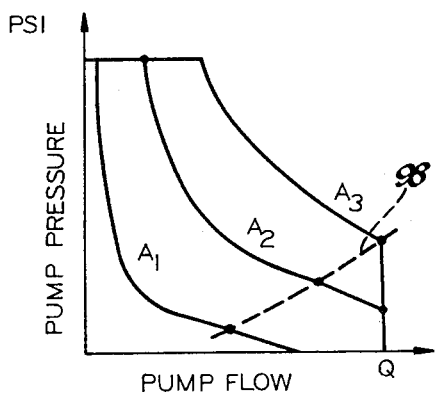
FIG. 6 is a plot of pump flow against pump pressure.

The combined results of the foregoing relationships as plotted are indicated in FIG. 6 wherein the pump flow and pump pressure obtained at control lever settings A1, A2, and A3 are indicated. Thus, for the position A1 of control lever 88, the pump flow will depend upon the pump pressure required to drive the hydraulic motor and will vary along the curve as indicated. Similarly, for control lever settings A2 and A3, the indicated relationship between pump pressure and flow will follow the curves there shown. Full pump displacement conditions are indicated by the dotted line 98.

Figure 7:
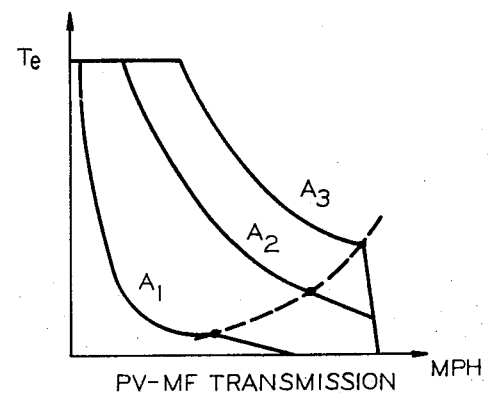
FIG. 7 is a plot of transmission output speed against tractive effort for a transmission with a fixed displacement motor.
Figure 8:
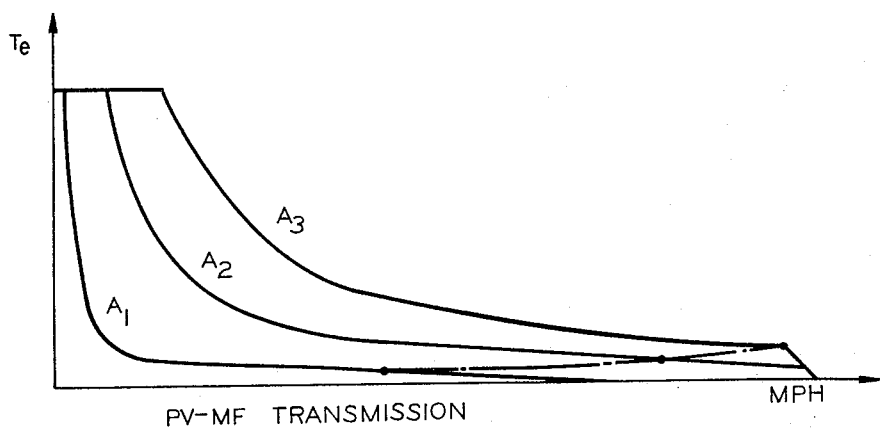
FIG. 8 is a plot of transmission output speed against tractive effort for a transmission with a variable displacement motor.

The overall performance of this control system as applied to a typical prime mover and transmission using a variable displacement pump and a fixed displacement motor is indicated in FIG. 7, which closely follows the contours of FIG. 6, but is expressed in terms of output speed as against tractive effort. Likewise, in FIG. 8, the corresponding curves are shown for a typical transmission utilizing both a variable displacement pump and a variable displacement motor.

I claim:

1. A control system for a variable ratio hydrostatic transmission comprising a variable displacement pump and a hydraulic motor driven thereby and for an internal combustion prime mover driving the pump, the control system comprising a ratio changing member for the transmission, a hydraulic servomotor for actuating the member, a pilot valve for controlling the servomotor, means forming a bridge circuit for controlling the pilot valve and including two bleed circuits, the first constituting a command circuit having, in series, restriction means providing a constant but adjustable pressure; the second constituting a feedback circuit and having, in series, a pair of laminar flow restrictions of variable length connected to be varied by the ratio changing member, means connecting the bridge circuit to that side of the hydrostatic transmission which is at the highest operating pressure, means connecting the pilot valve to respond to the difference in pressure between the intermediate points in the two bleed circuits, a fuel supply regulator for the internal combustion prime mover and a common operating member for the fuel supply regulator and for the adjustable pressure restriction means whereby the torque input to the pump at any fuel supply rate may be matched to the torque output of the prime mover at a desired point on its torque-speed characteristic curve for that fuel supply rate.

2. A control system as defined in claim 1 having a selector valve in one of the bleed circuits for reversing the flows to and from the pilot valve to reverse the operation of the transmission.

3. A control system for a variable ratio hydrostatic transmission comprising a variable displacement pump and a hydraulic motor driven thereby and for an internal combustion prime mover driving the pump, the control system comprising a ratio changing member for the transmission, a hydraulic servomotor for actuating the member, a pilot valve for controlling the servomotor, means forming a bridge circuit for controlling the pilot valve and including two bleed circuits, the first constituting a command circuit having, in series, restriction means providing a constant but adjustable pressure, the second constituting a feedback circuit and having, in series, a pair of restrictions connected to be equally and oppositely varied by the ratio changing member, means connecting the bridge circuit to that side of the hydrostatic transmission which is at the highest operating pressure, means connecting the pilot valve to respond to the difference in pressure between the intermediate points in the two bleed circuits, a fuel supply regulator for the internal combustion prime mover and a common operating member for the fuel supply regulator and for the adjustable pressure restriction means whereby the torque input to the pump at any fuel supply rate may be matched to the torque output of the prime mover at a desired point on its torque-speed characteristic curve for that fuel supply rate.

* * * * *